(No Model.) 7 Sheets—Sheet 1.

G. W. CLARK.
HEATING BOILER.

No. 532,533. Patented Jan. 15, 1895.

Attest:
L. Lee
Edw. Kinsey

Inventor.
George W. Clark,
per Thomas S. Crane, Atty.

(No Model.)

G. W. CLARK.
HEATING BOILER.

No. 532,533. Patented Jan. 15, 1895.

Attest:
L. Lee.
Edw. Kinsey.

Inventor.
George W. Clark,
per Thomas S. Crane, Atty.

(No Model.) 7 Sheets—Sheet 3.

G. W. CLARK.
HEATING BOILER.

No. 532,533. Patented Jan. 15, 1895.

Attest:
L. Lee.
Edw. Kinsey.

Inventor.
George W. Clark,
per Thomas S. Crane, Atty.

THE NORRIS PETERS CO., PHOTO-LITHO., WASHINGTON, D. C.

(No Model.)　　　　　　　G. W. CLARK.　　　　　7 Sheets—Sheet 4.
HEATING BOILER.

No. 532,533.　　　　　　　　　　　Patented Jan. 15, 1895.

Attest:
L. Lee,
Edw. Kinsey.

Inventor.
George W. Clark,
per Thomas S. Crane, Atty.

(No Model.)

G. W. CLARK.
HEATING BOILER.

No. 532,533. Patented Jan. 15, 1895.

Attest:
L. Lee
Edw. Kinsey

Inventor.
George W. Clark,
per Thomas S. Crane, Atty.

(No Model.) 7 Sheets—Sheet 6.
G. W. CLARK.
HEATING BOILER.

No. 532,533. Patented Jan. 15, 1895.

Attest:
L. Lee.
Edw. P. Kinsey.

Inventor.
George W. Clark,
per Thomas S. Crane, Atty.

UNITED STATES PATENT OFFICE.

GEORGE W. CLARK, OF NEWARK, NEW JERSEY.

HEATING-BOILER.

SPECIFICATION forming part of Letters Patent No. 532,533, dated January 15, 1895.

Application filed August 7, 1894. Serial No. 519,688. (No model.)

*To all whom it may concern:*

Be it known that I, GEORGE W. CLARK, a citizen of the United States, residing at Newark, Essex county, New Jersey, have invented certain new and useful Improvements in Boilers for Heating by Steam or Hot Water, fully described and represented in the following specification and the accompanying drawings, forming a part of the same.

The present invention relates to that class of steam or hot water boilers, which is composed of vertical transverse sections having water legs with intermediate fire space adapted to form, with suitable grates, a fire box from which the gases are conducted to the smoke pipe through passages in and between the sections.

The invention is described in connection with six sections, including front and rear sections of special construction; but flat plates may be used instead of special sections at the front and rear ends, and any number of sections may be used. The intermediate sections are of duplex character, being divided vertically at the center, and the half sections connected by suitable pipes with a steam or water drum above their line of division.

The improvements consist partly, in the arrangement of smoke passages between and through the half sections; partly, in the particular construction of the front and rear sections to expose the surface most effectively to the heat of the fuel; partly, in a grate surface having the corners cut off and the vertical passages between the sections correspondingly arranged, so as to avoid a deficiency of draft in the corners of the fire box; and partly, in a special arrangement of the pipe connections for using one boiler section independently of the others to supply hot water for household or other purposes, while the other sections supply water or steam for heating radiators. Such independent section may be connected with a range-boiler or water-back to heat the water when the range is without water.

The invention also includes a frame supported removably in the ash box and carrying all the grates with their working mechanism, thus permitting all the grates to be withdrawn in a body for inspection and repairs.

The invention will be understood by reference to the annexed drawings, in which—

Figure 1 is a front elevation of the boiler, and Fig. 2 a rear elevation of the same.

The front section is lettered A, the four duplex sections B, and the rear section C. A smoke box D, D', is attached to the outer side of the rear section, and a front plate E to the outer side of the front section A, to sustain the various doors for feeding and cleaning out.

All the sections are formed, above the fire box, with transverse passages G (shown four in number), which form continuous horizontal flues, which are connected directly with the fire box by vertical passages H formed between the sections by notching their adjacent edges.

Figure 5:
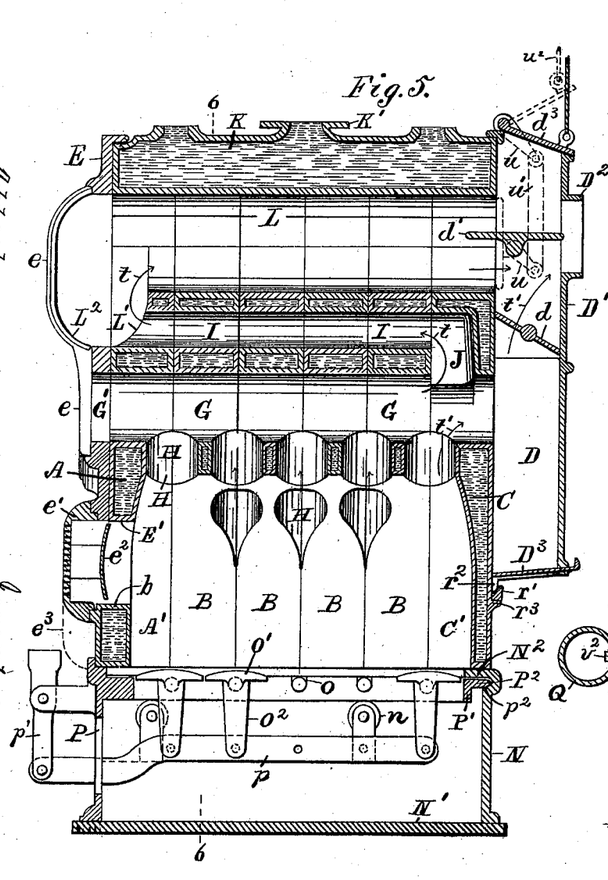
Fig. 5 is a vertical section on line 5, 5, in Fig. 6.

All the sections except the rear section C, are also formed, above the flues G, with a series of flue passages I, one of which is shown in Fig. 5, as well as one of the flues G, and a vertical passage J is formed in the rear section C to connect the flues G and I.

The adjacent corners of the duplex sections are quadrantally notched at the top to form the bottom of an indirect flue L, and a drum K of crescent shape is applied with its concave side over the dividing line of the sections to form the upper side of the flue. The drum is formed with thin flanges $k$ at its lower edges to fit between the half sections, and the latter are extended outwardly from such flanges, and then upwardly to admit threaded nipples or "long-screws" M which connect the upper parts of the half sections with the lowest point within the drum. The drum is thus effectively drained whenever the boiler is emptied.

Figures 11, 13:
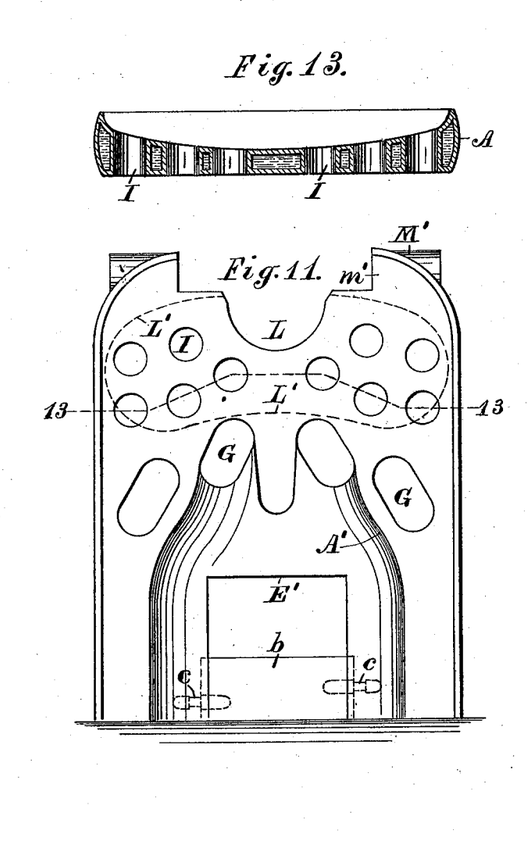
Fig. 11 shows the inner side of the front section, and Fig. 12 the inner side of the rear section.
Figs. 13 and 14 are sections on lines 13, 13, and 14, 14, in Figs. 11 and 12.
Figure 12:
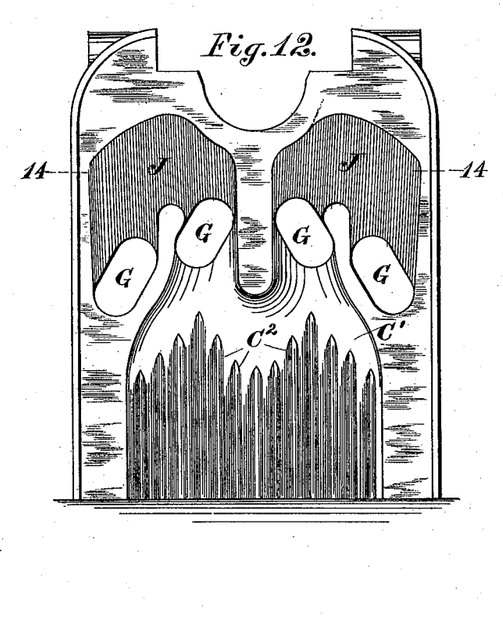
Figure 14:
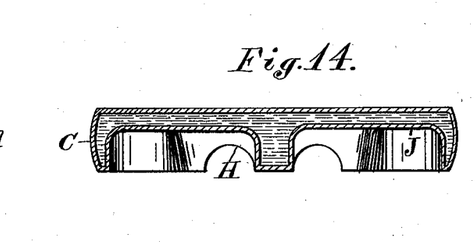

The front and rear sections A, C, are formed with upward projections $m'$ corresponding to those upon the duplex sections, and are connected with the drum in like manner by nipples M. As the front and rear sections are formed each in a single piece, I provide bosses M' upon the outer sides of the projections $m'$ in line with the pipes M, and form holes through such bosses for introducing the tools for drilling and tapping the apertures for the pipes, which holes are finally closed by plugs $m$. The half sections do not require the bosses M' upon their outer sides, as they are movable to and from the drum K, during the screwing up of the nipples M; but the front and rear sections A, C, are made of corresponding shape (as shown in Figs. 11 and 12) to each of the duplex sections to secure uniformity in the fitting of the drum and its pipes. The water legs of all the sections are connected by pipes $q$ to lateral headers Q which are formed upon the top with water inlets $q'$ adjacent to the joints between the sections, to receive the return water pipes from a heating system, if the boiler be connected with such a system.

Figure 4:
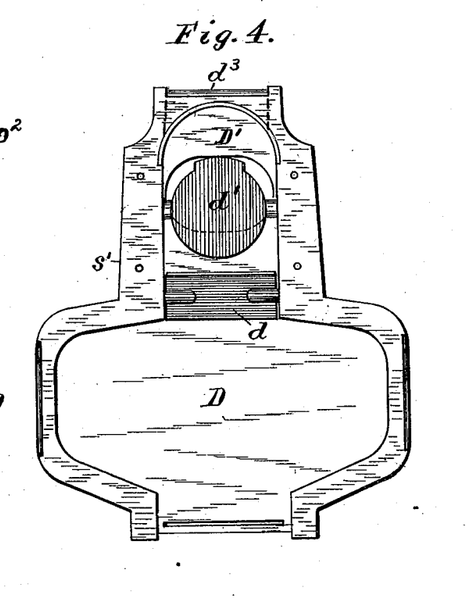

The drum K is shown formed with outlets K' intermediate to the inlets $q'$, and the inlets and outlets are thus alternated, so that flow pipes extended horizontally from the outlets K, and return pipes extended vertically from the inlets $q'$, are adapted to clear one another. The smoke box, as shown in Fig. 4, is formed with a wide chamber D at the bottom to receive the gases from the four flues G, and with a narrow chamber D' at the top to receive the gases from the flue L. A pipe collar $D^2$ is formed upon the chamber D', and a check draft door $d^3$ is applied to its top.

The rear section is provided with a projecting rib $r$ to close the joint around the margin of the smoke box, where a bolting flange $s'$ is formed. Dove tails $r'$ are formed upon the section C at the bottom of the smoke box, and the box is provided with lugs $r^2$ to engage the same; thus furnishing a support for the smoke box while adjusting and bolting the same in place, and locking the lower end to the rear section without the use of bolts. The dove tails are connected by a rib $r^3$ of equal height with the same, to sustain the weight of the section when laid upon its back, and thus prevent the breakage of the dove tails.

A slide $D^3$ is provided in the bottom of the chamber D to discharge the soot which may be forced into the latter in the cleaning of the flues.

Figures 1, 2:
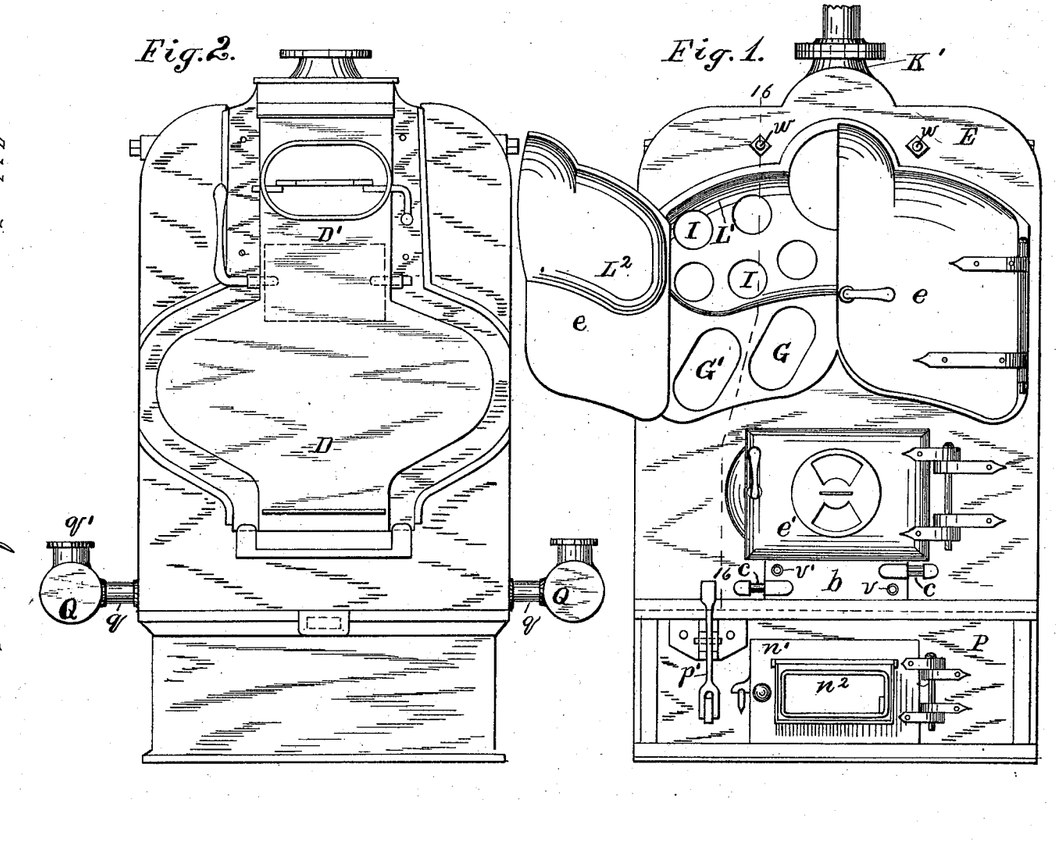
Figure 3:
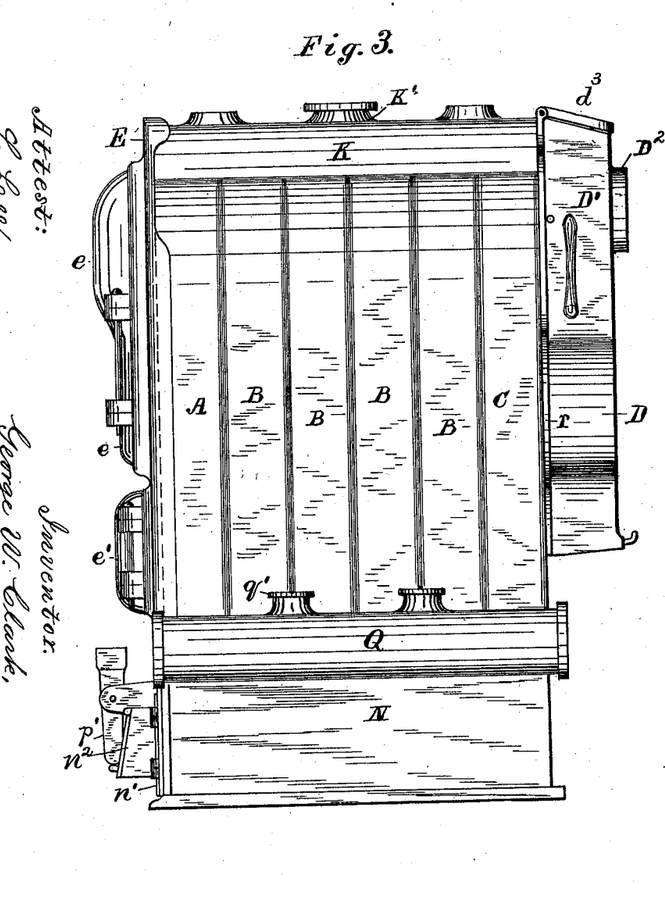
Fig. 3 is a side elevation and Fig. 4 an inside view of the smoke box detached from the rear section.

A damper $d$ is shown at the bottom of the chamber D', which when open permits the gases, as indicated by the arrows $t'$, to pass directly from the passages H through the flue G to the smoke pipe; but when the damper $d$ is closed, as shown in Fig. 5, the gases are driven upward from the flues G through the flues I, into the indirect flue L, a connection between such flues being formed by a recess L' in the front section, and supplemented by a recess $L^2$ in the cleaning out door $e$ upon the front plate E. A damper $d'$ is applied to the rear end of the flue L and is connected by cranks $u$ and link $u'$ with the check draft door $d^3$. The latter may be actuated by a suitable connection as the cord $u^2$ to a damper regulator, and the cranks $u$ are so adjusted that when the damper $d'$ is open, as shown in full lines in Fig. 5, the check draft $d^3$ is closed, and the gases may then pass through all the flues, as indicated by the arrows $t$. The opening of the check draft then operates to close the damper $d'$, as indicated by dotted lines in Fig. 5, and thus wholly checks the operation of the fire. The front plate E, as shown in Fig. 1, is formed with a large opening, giving access to the flues I and L, for cleaning the same, and with smaller openings G' for cleaning out the flues G. Such openings are exposed to view by the opening of the left hand door $e$, which also exhibits the recesses L' and $L^2$. The doors E tightly close the flues G at the forward end.

The sections are shown assembled upon an ash box casting N which may be set upon brick work or mounted upon a foundation plate N' as shown in Fig. 5.

Figure 9:
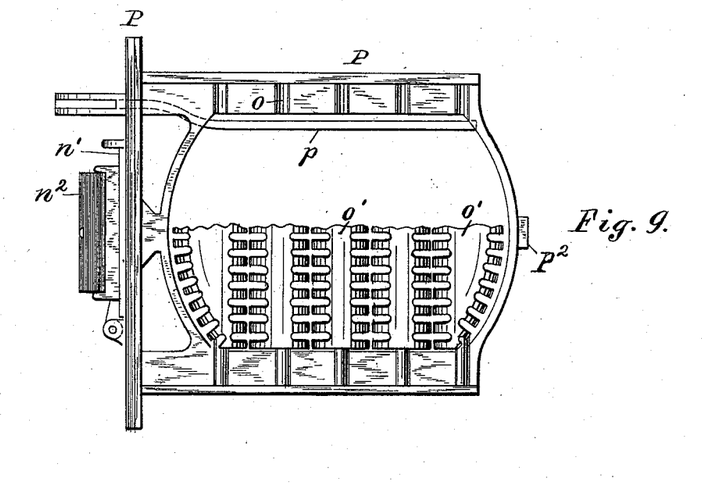
Fig. 9 is a plan of the grate frame with the grates broken and shown only in the right side of the same.
Figure 10:
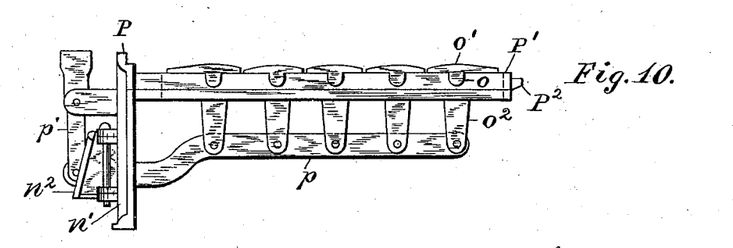
Fig. 10 is a side elevation of the frame and grates.

The entire front P of the ash box is made removable, and attached to a grate frame P', as shown in Figs. 9 and 10, adapted to sustain the grates removably within the ash box. The removable front P is provided, as shown in Figs. 1 and 9, with a draft door $n'$ and a draft regulator door $n^2$, and the frame P' is shown formed with segmental ends as well as the grate, and the boiler sections adjacent to such ends are formed with segmental recesses A' and C' to correspond thereto. The front and rear ends of the entire grate surface are thus rounded at the corners, and the lower ends of the front and rear sections A, C, are hollowed segmentally upon their inner sides to correspond with such form, thus producing a fire box and furnace without any dead corners where the draft is likely to be deficient.

Figure 8:
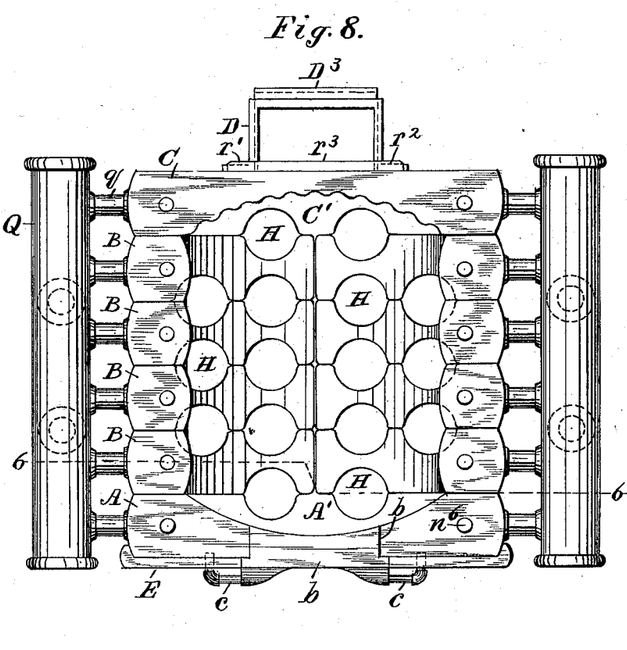
Fig. 8 shows the under side of the six sections, which are inverted to expose the vertical smoke passages between the same.

It will be observed that some of the flue passages G pass through the sections over the middle of the fire box, while the other passages G pass through the sections over the outer sides of the fire box. Where this is the case, the middle and outer passages H may be arranged to direct the heated gases into all or a part of such flues. The vertical draft passages H in the front and rear sections may therefore be arranged in correspondence with the shape of the fire box, by forming only two of such vertical passages over the middle of the fire box adjacent to the front and rear sections; while four of such passages are formed (over the middle and sides of the fire box) between the remaining sections. The segmental shape thus produced at the ends of the furnace is shown in Fig. 8, with the corresponding disposition of the vertical smoke passages H.

Anti-friction rolls $n$ are provided within the sides of the ash box to sustain the weight of the frame, and the upper side of the latter is shown formed with bearings $o$ to support the journals of rocking grates $o'$.

Two of the grates are omitted from the drawings, in Fig. 5, to show the fitting of the frame P' between the rolls $n$ and the upper flange $N^2$ of the ash box; which locks the journals of the grates in their bearings. The grates are shown formed as usual with cranks $o^2$ and coupling bar $p$ to which is connected the raker arm $p'$ pivoted upon the movable front of the ash box. With this construction the front P and frame P', with the grates and all their shaking apparatus, may be drawn bodily out from the ash box; which permits the grates to be readily removed from their open bearings $o$ and renewed, or their fixtures repaired, without entering the fire box or detaching any parts of the boiler.

A tongue $P^2$ is shown at the rear end of the grate supporting frame P', and a corresponding ledge or notch $p^2$ is shown within the rear end of the ash box to engage such tongue when the frame is pushed in its normal position, thus facilitating the entrance of the tongue into the notch to support the frame independently of the rolls $n$.

Figure 6:
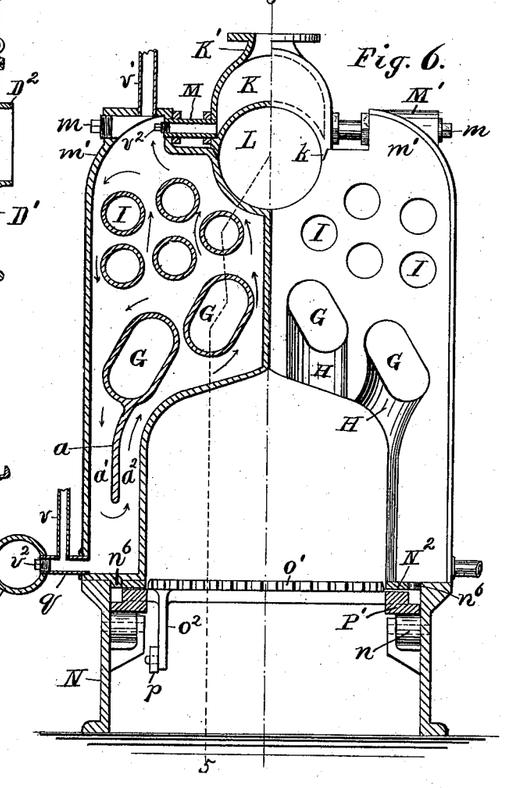
Fig. 6 is a vertical section on line 6, 6, in Fig. 8, showing the interior of one of the half sections, and the exterior of another.
Figure 7:
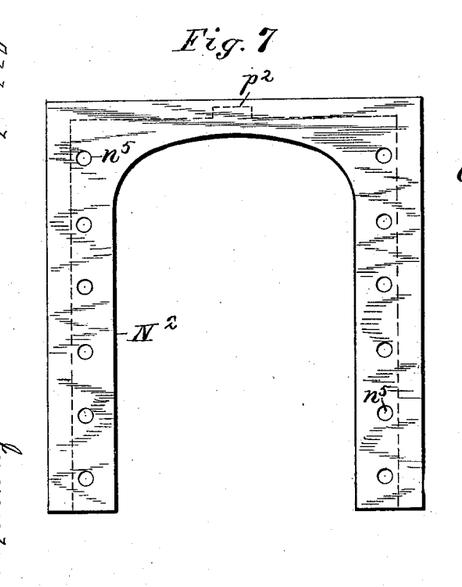
Fig. 7 is a plan of the ash box with the grates and their supporting frame removed.

The flange $N^2$ supports the several sections, and is shown in Fig. 7 provided with holes $n^5$ adapted to receive dowel pins $n^6$ upon the lower ends of the sections, as shown in Figs. 6 and 8. The holes $n^5$ serve, with the dowels $n^6$, to hold the several sections in their proper relative position before the connections are made to the headers K and Q, and furnish an additional support, when the boiler is in use, to prevent the half sections from spreading outwardly at the base. The opening E' for fuel door is shown a considerable distance above the grate level, as is common where coal is to be burned, and the door $e'$ is shown provided with the usual guard plate $e^2$ behind which air would be introduced to cool it in the usual manner. The furnace may, however, be adapted to burn wood, by making the front section removable below the door opening E'. A removable water block $b$, for thus deepening the door, is shown in Figs. 1, 5 and 8, secured in place below the opening E' by means of pipe connections $c$. The block is made thick enough to project through the front plate E, and the outer ends of the connections are inserted respectively through the front into the section A at the sides of the block. When the furnace is arranged for burning wood, the connections are unscrewed and the block detached, and a door of greater depth is then hinged upon the same lugs as the door $e'$ so as to inclose the increased fuel opening. Such increased depth of the fuel door is indicated by the dotted lines $e^3$ in Fig. 5, where the connections $c$ are omitted.

In Fig. 6, a partition $a$ is shown extended from the lower side of the flue opening G downward into the water leg, thus forming two channels $a'$ and $a^2$ for ascending and descending water currents, which are indicated by arrows adjacent to the partition. Other arrows are shown directed upward within the section in proximity to the hottest parts, and other arrows directed downwardly at the outer side of the section, where the descending currents would form when the outward circulation was cut off.

The operation of the flues is as follows: The gases generated in the fire box pass at all times upward through the passages H into the flues G, and when the fire is kindled (and the damper $d$ opened) escape directly to the smoke outlet, as indicated by the arrows $t'$. When the fire is burning suitably to close the damper $d$, the gases pass from the flue G at their rear end upward through the passage J into the flues I, and thence at the forward end of the flues into the indirect flue L. The damper $d'$ is opened, as shown in Fig. 5, when a draft is desired through such flue, and closed, as well as the damper $d$, when the action of the fire is to be suspended.

When the boiler is connected with a system of heating radiators, the water passes from the various sections through their upward projections $m'$ into the pipes M and header K, from which it flows by the opening K, and is returned to the water legs of the sections by the headers Q and pipes $q$.

It will be observed that the three flues G, I and L, are connected in pairs at their opposite ends, by the spaces J and L', and thus form a continuous passage for the smoke, and that the drum K not only covers but forms a part of the flue L. The upper sides of the flues G, in great part, receive the direct heat rays from the fuel, as the passages H open from the fire box directly into such flues, and the flue thus forms a large part of the combustion chamber, within the boiler, in which the flames are generated, and around which the water is exposed to the greatest heat of the fire. To promote combustion in such flues, they are made few in number (as for instance, two), and of proper area to produce the desired combustion, while the return flues I are made more numerous (five in each half section) and much smaller in area, as the gases are colder when moving in such flues, and an increased metallic surface is needed to absorb their heat.

The recesses L' and $L^2$ co-operate to form a large space within the door $e'$ at the forward end of the return flues I, which space receives the smoke from all of the ten flues and delivers it freely to the indirect flue L. This flue is made of such dimensions as to offer no resistance to the escaping gases; while it absorbs the heat still farther in the surrounding walls. It will be observed that the smoke box furnishes a common connection for the direct and indirect flues to the smoke outlet, while the damper $d$ operates to divide such connections when it is desired to use the indirect flue.

In each of the duplex sections, as well as in the front and rear sections, the lower half of the flue L is formed by a semi-circular recess at the middle of the section upon the top, and the crescent shaped drum is applied to cover, and form the upper part of said flue.

In Fig. 8, the lower end of the front E is shown with the water block $b$ projecting through the same, and it will be observed that the opening in the front is made a little wider than the opening in the section A, and flanges $d$ are formed upon the ends of the block which lie upon the front of the section, and hold the block securely in the required position.

Figure 15:
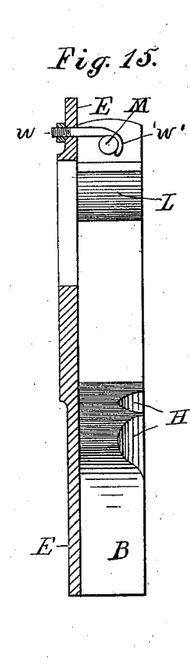
Fig. 15 shows the inner edge of the section A and a sectional view of the front plate E, with the bolt for securing the plate to the front section.

Fig. 15 shows the means for securing the front plate to the section A by bolts $w$, which are formed at their inner ends with hooks $w'$ to embrace the pipes M, and provided with nuts upon the outer end to draw the parts firmly together.

Figure 16:
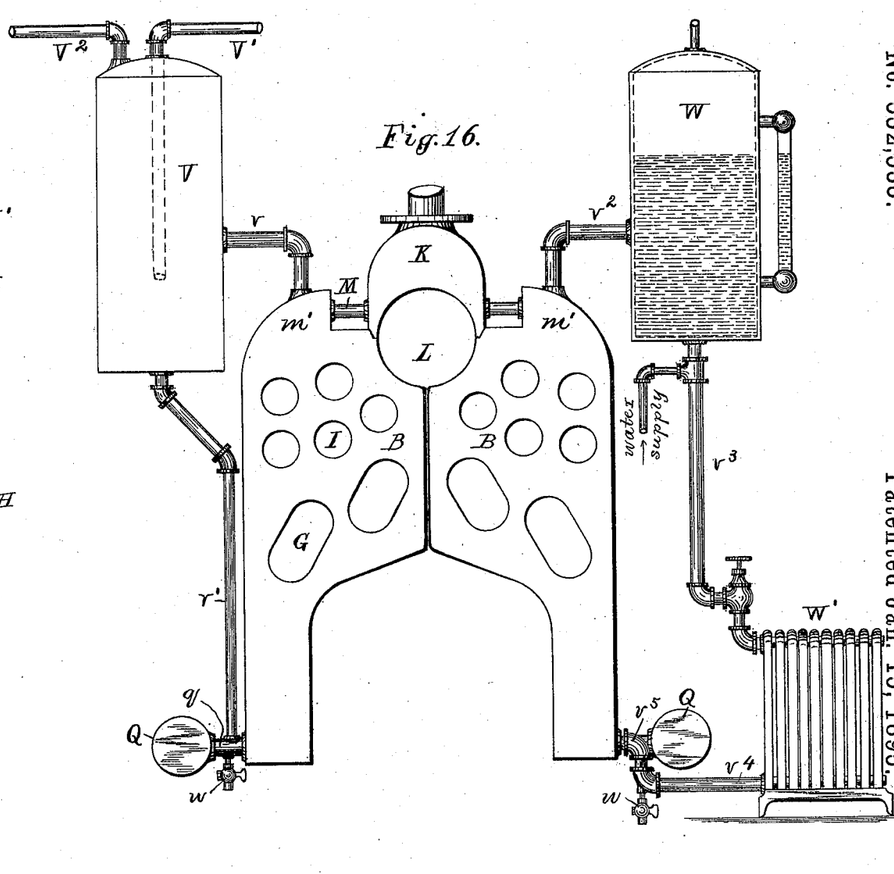
Fig. 16 is an elevation of two sections B with connections to a range-boiler and an expansion tank.

In Fig. 16 one of the sections B is shown with branch connections $v$, $v'$ extended to a range boiler V, which is represented diagrammatically to show a means for utilizing a portion of the heating boiler to furnish water for household consumption. The connections from the range boiler to the water-back are not shown, as their construction and operation are already well known; but the pipes $V'$, $V^2$ from the top of the boiler represent the connections for circulating the hot water. For such purpose any section of the heating boiler may be disconnected from the drum K and header Q, which is illustrated in Fig 6, where the outer ends of the pipes M and $q$ are shown closed by plugs $V^2$, and branch pipes $v$, $v'$ are shown extended from the top and bottom respectively of one of the half sections. By such disconnection of any section in the boiler, the section is adapted to operate upon an independent circuit, and to thus furnish water for household consumption, while the remaining sections of the boiler supply steam or water for heating radiators.

In Fig. 16, the opposite half section is shown connected with an expansion tank which would be located at any desired point, but is shown, like the range boiler, in diagrammatic form.

The tank W is connected by pipe $v^2$ with the top of the section B, and a radiator $W'$ is shown in circuit with the bottom of the tank and the bottom of the boiler section, through pipes $v^3$ and $v^4$, the latter of which is connected directly by an elbow $v^5$ with the bottom of the section B.

Both the half sections shown in Fig. 16 would be cut off from the drum K (as shown in Fig. 6), and also from the headers Q, by either of the means described.

Stop cocks $w$ are shown at the bottom of the connections to drain the half sections when desired.

With the construction illustrated in Fig. 16 any section of the boiler may be used to supply hot water to an independent circuit for household consumption; and another section of the boiler may be used to supply hot water to radiators upon the same level as the boilers, or upon the floors above the same; while the remaining sections of the boiler are used in generating steam for heating purposes. The boiler as described, thus furnishes a construction which, when required, by a slight change in the connection of its sections, may be used to supply three distinct systems of circulation at the same time, a part of which may be operated with hot water by means of the open tank W or hot water reservoir V, while the remainder are used in generating steam.

It is obvious that the water-block $b$ shown in Figs. 1 and 8 could be thus connected with a tank or range-boiler, and operate the same as a water-back in an ordinary range, the fire, upon the grate $o'$ shown herein, operating to heat the water-block the same as the fire in a range fire-pot. The block $b$ in such case would not need the connection $c$ to the front boiler section A; but the connection $c$ would be extended to the tank or range boiler in precisely the same manner as the connections $v$, $v'$, shown in Fig. 16. I have therefore claimed the connection of any separate section of the heating boiler with a hot water supply system, and have also made specific claim to the connection of the water bock $b$ with such a system, as, for such a purpose, the water block may be regarded as an independent section of the heating boiler. The connections $v$ and $v'$ are indicated in Fig. 1 at the opposite ends of the block $b$, and when used, the connection $c$ would be removed, and the apertures plugged.

Having thus set forth the nature of the invention, what is claimed herein is—

1. In a steam or hot water boiler, a series of flat vertical sections having water legs with fire box between the same, direct flues formed through the sections, and an indirect flue formed partly in the top edges of the sections, with a crescent shaped drum applied to form the upper part of such flue, and means for connecting the interior of the drum with the sections, as herein set forth.

2. In a steam or hot water boiler, a series of flat vertical sections having water legs with fire box between the same, a crescent shaped drum arranged above the middle of the sections, the projections $m'$ upon the sections at the sides of the drum, and pipes M connecting the interior of the drum at the lower part with the projections $m'$.

3. In a steam or hot water boiler, a series of flat vertical sections having water legs with fire box between the same, direct and return flues formed by passages through the sections, and an indirect flue formed partly in the top edges of the sections, with a drum applied to cover and form the upper part of the same, and means for connecting the interior of the drum with the sections and for connecting the flues in pairs at opposite ends, substantially as set forth.

4. In a steam or hot water boiler, a series of flat vertical sections having water legs with fire box between the same, and flues formed through the sections with vertical passages H leading upward from the fire box into such flues and conducting the entire body of gases thereto, and a connection from such flue to a smoke outlet, as herein set forth.

5. In a steam or hot water boiler, a series of flat vertical sections having water legs with fire box between the same, direct flues formed through the sections with vertical passages H leading upward from the fire box into such flues and conducting the entire body of gases thereto, return flues I formed through the sections above the direct flues, a connection between the direct and return flues at their rear ends, and a connection from the forward end of the return flues to the smoke outlet, as and for the purpose set forth.

6. In a steam or hot water boiler, a series of flat vertical sections having water legs with fire box between the same, direct flues formed through the sections with vertical passages H leading upward from the fire box into such flues, return flues I formed through the sections above the direct flues, a connection between the direct and return flues at their rear ends, an indirect flue above such return flues, a front having a recess connecting the return flue and indirect flue, and a smoke box forming a common connection for the rear ends of the direct and indirect flues to the smoke outlet, and a damper in the smoke box to divide such connection, substantially as herein set forth.

7. In a steam or hot water boiler, a series of flat vertical sections having water legs with fire box between the same, the direct flues G formed through the sections, front and rear sections adapted to close the ends of the fire box with a fuel doorway in the front section, vertical passages H between the sections into the direct flues, the return flues I of greater number than the direct flues, the passage J in the rear section connecting the flues G' and I, an indirect flue connected with the smoke outlet, and a front having a door $e$ for cleaning out the return and indirect flues, and a recess within the door for connecting the return and indirect flues, substantially as herein set forth.

8. In a steam or hot water boiler, a flat vertical section having water legs at opposite sides with fire box between the same, the two passages G for direct flues, the smaller and more numerous passages I above the same for return flues, the semi-circular recess at the middle of the section upon the top, and the crescent shaped drum over such recess forming the indirect flue L, the projections M' extended upward at the outer corners of the section, the pipe apertures upon the inner side of the projections and upon the sides of the drum with nipples M secured therein, and the bosses $m'$ in line with the pipe apertures and provided with the openings closed by the plugs $m$, substantially as herein set forth.

9. In a steam or hot water boiler, a series of flat vertical sections having water legs with fire box between the same, the direct flues G formed through the sections with connection to the smoke outlet, vertical passages H over the middle of the fire box at the ends of the same and vertical passages over the middle and sides of the fire box intermediate to the ends, to draw the draft away from the corners of the grate, substantially as herein set forth.

10. In a steam or hot water boiler, a series of flat vertical sections having water legs with fire box between the same, the direct flues G formed through the sections with connection to the smoke outlet, the vertical passages H over the middle of the fire box at the ends of the same, the vertical passages H over the middle and sides of the fire box intermediate to the ends, and a grate with rounded or segmental ends in correspondence with such arrangement of the vertical passages, substantially as shown and described.

11. In a steam or hot water boiler, a series of flat vertical sections having water legs with fire box between the same, the front and rear sections A and C being provided respectively upon their inner sides with the segmental recesses A' and C', and a fire box fitted to the lower ends of the water legs and provided with a series of rocking grates $o'$ formed of the segmental end sections and intermediate parallel sections, substantially as and for the purpose set forth.

12. In a steam or hot water boiler, the combination, with a series of sections having water legs with fire box between the same, of an ash box having the top plate fitted to the lower ends of the water legs and having the frame P' fitted removably thereto, and grates fitted detachably within the frame, substantially as herein set forth.

13. In a steam or hot water boiler, the combination, with a series of sections having water legs with fire box between the same, of an ash box having the top plate fitted to the lower ends of the water legs and having the front P removable, the frame P' attached to such front, means within the ash box for supporting the frame movably, and grates fitted detachably to the frame, substantially as herein set forth.

14. In a steam or hot water boiler, the combination, with a series of vertical sections having water legs with fire box between the same, and provided upon their lower ends with the dowels $n^6$, of an ash box having the top flange $N^2$ to receive the dowels and having the front P and frame P' fitted removably thereto, with grates supported detachably upon the frame, the whole arranged and operated as set forth.

15. In a steam or hot water boiler, the combination, with a series of vertical sections having water legs with fire box between the same, of a single header connected with the tops of the two sections, and the headers Q connected with the water legs of the sections, and the outlets K' and inlets $q'$ upon the respective headers arranged alternately, as set forth, to make the inlet and outlet pipes clear one another.

16. In a steam or hot water boiler, the combination, with a series of vertical sections having flues formed through the same, of a rear section provided with the dove tails $r'$ and a smoke box having at its lower end lugs $r^2$ to engage the same, and provided at a higher point with a flange and bolts for securing it to the section, as herein set forth.

17. In a steam or hot water boiler, the combination, with a series of flat vertical sections having direct and return flues extended through the same for the greater part of their width, with a single indirect flue over the middle of the sections, and connections at the alternate ends of the flues as set forth, of the smoke box applied to the rear section and having the broad chamber D connecting with the direct flues, and the narrow chamber D' above the same connecting with the indirect flue, and having the damper $d$ fitted between the two chambers, as and for the purpose set forth.

18. In a steam or hot water boiler, the combination, with a series of flat vertical sections having direct and return flues extended through the same for the greater part of their width, with a single indirect flue over the middle of the sections, and connections at the alternate ends of the flues as set forth, of the smoke box applied to the rear section, the broad chamber D with cleaning door $D^3$ at the bottom, the narrow chamber D' having the smoke outlet $D^2$, the damper $d'$ and the draft check $d^3$, and the damper $d$ fitted between the two chambers, as and for the purpose set forth.

19. In a steam or hot water boiler, the combination, with a series of flat vertical sections having direct and return flues extended through the same for the greater part of their width, with a single indirect flue over the middle of the sections, and connections at the alternate ends of the flues as set forth, of the smoke box applied to the rear section, with chambers connected respectively with the direct and indirect flues, the damper $d$ between the chambers, the smoke outlet $D^2$ above such damper, the draft check $d^3$ upon the top of the smoke box, the indirect damper $d'$ within the smoke box, and the connections $u, u'$, for closing the damper $d'$ as the draft check is opened, substantially as herein set forth.

20. In a steam or hot water boiler, the combination, with suitable front and rear sections, of the series of duplex sections formed with water legs at opposite sides of the fire box, a steam drum extended over the top of all the sections, and each duplex section being composed of half sections connected to opposite sides of the steam drum, and the half sections at the opposite sides of the boiler having upon the outer sides of their water legs the pipes $q$, and the separate headers Q connected therewith, substantially as set forth.

21. In a steam or hot water boiler, the combination, with suitable front and rear sections, of a series of duplex sections formed with water legs at opposite sides of a fire box, each duplex section being composed of half sections complete in themselves and united by nipples to a steam drum above the middle of the boiler, and at their water legs by suitable nipples with headers Q, and the nipples being closed in one or more of the sections and such section provided with independent pipe connections $v$ to maintain an external circulation separately from the other sections, substantially as set forth.

22. In a steam or hot water boiler, the combination, with flat vertical sections, of a hollow front section provided with a fuel door opening above the bottom edge of the section, the water block $b$ inserted below the fuel door, and the water connections $c$ uniting the interior of the block with the interior of the section, substantially as set forth.

23. In a steam or hot water boiler, the combination, with flat vertical sections, of a hollow front section provided with a fuel door opening above the bottom edge of the section, the water block $b$ inserted below the fuel door, and water connections $c$ connecting the ends of the block at different levels with the body of the section, as and for the purpose set forth.

24. In a steam or hot water boiler, composed of flat vertical sections, the hollow front section A having the passages to form the flues G and I, the recess L' in the outer side of the section, and the segmental recess A' upon the inner side of the section at the bottom, with fuel doorway opening into the same, substantially as herein set forth.

25. In a steam or hot water boiler composed of flat vertical sections, the hollow front section A having the passages to form the flues G and I, the recess L' in the outer side of the section, the segmental recess A' upon the inner side of the section at the bottom, with the notches H leading from such segmental recess into the passages G, and the block $b$ inserted below the fuel door and provided with the connections $c$ uniting the interior of the block with the interior of the section, substantially as set forth.

26. In a steam or hot water boiler composed of flat vertical sections, the hollow rear section A having the passages G, the space J upon the inner side of the section extending above the passages, and the segmental recess C' upon the inner side of the section at the bottom, with the notches H leading from such segmental recess into the passages G, substantially as herein set forth.

27. In a steam or hot water boiler composed of flat vertical sections, the hollow rear section C having the middle and outer passages G, the space J upon the inner side of the section extending above the passages, and the segmental recess C' upon the inner side of the section at the bottom, with vertical corrugations $C^2$, and the passages H leading from such segmental recess into the middle passages G, as and for the purpose set forth.

28. In a steam or hot water boiler composed of flat vertical sections, the combination, with a steam drum and return water headers or drums, of certain sections connected therewith for a common circulation, and one section disconnected therefrom and provided with pipes for an independent circuit, substantially as herein set forth.

29. In a steam or hot water boiler composed of flat vertical sections, the combination, with a steam drum and return water headers or drums, of certain sections connected therewith for a common circulation, and one section disconnected therefrom and having pipes at the top and bottom connected in circuit with a tank, range-boiler or domestic hot water supply, so as to furnish water for consumption and water for heating radiators from the same boiler, substantially as herein set forth.

30. In a steam or hot water boiler, the combination, with a series of flat vertical sections connected at the top by a steam drum and at the bottom by return water drum or header, of a front section provided with a fuel door opening having the water block $b$ inserted below the same adjacent to the grate, to form a section for an independent water circuit, with water connections $v, v'$, for joining the upper and lower parts of such water block with the upper and lower parts of a water tank or range-boiler, so as to furnish water for consumption, and water or steam for heating radiators from the same boiler, substantially as herein set forth.

31. In a steam or hot water boiler composed of separate sections, the combination, with a drum at the top and a header at the bottom, of certain sections connected therewith and having inlet and outlet pipes for a common circulation, one section being disconnected therefrom and having pipes connected in circuit with a range boiler to furnish hot water for consumption, and another section disconnected therefrom and having pipes connected in circuit with the expansion tank W and the radiator W', and operated to circulate hot water through the same, the boiler thus maintaining three independent systems of circulation, substantially as herein set forth.

In testimony whereof I have hereunto set my hand in the presence of two subscribing witnesses.

GEO. W. CLARK.

Witnesses:
JAMES T. BOYD,
J. B. FAITOULE.